(12) United States Patent
Tomerlin et al.

(10) Patent No.: US 7,114,069 B2
(45) Date of Patent: Sep. 26, 2006

(54) RECONFIGURABLE PROCESSING CIRCUIT INCLUDING A DELAY LOCKED LOOP MULTIPLE FREQUENCY GENERATOR FOR GENERATING A PLURALITY OF CLOCK SIGNALS WHICH ARE CONFIGURED IN FREQUENCY BY A CONTROL PROCESSOR

(75) Inventors: Andrew Tomerlin, Coral Springs, FL (US); Nicholas Giovanni Cafaro, Coconut Creek, FL (US); Robert E. Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 68 days.

(21) Appl. No.: 10/420,221

(22) Filed: Apr. 22, 2003

(65) Prior Publication Data

US 2004/0215995 A1    Oct. 28, 2004

(51) Int. Cl.
*G06F 9/00* (2006.01)
(52) U.S. Cl. ......................................... 713/100; 326/39
(58) Field of Classification Search ................ 713/300, 713/320, 322, 500, 501, 1, 2, 100; 326/39; 331/25, 60
See application file for complete search history.

(56) References Cited

U.S. PATENT DOCUMENTS

| | | | |
|---|---|---|---|
| 5,684,434 A | 11/1997 | Mann et al. | |
| 5,774,703 A * | 6/1998 | Weiss et al. | 713/501 |
| 5,922,076 A | 7/1999 | Garde | |
| 5,963,069 A * | 10/1999 | Jefferson et al. | 327/158 |
| 6,091,760 A | 7/2000 | Giallorenzi et al. | |
| 6,141,374 A | 10/2000 | Burns | |
| 6,147,531 A | 11/2000 | McCall et al. | |
| 6,163,224 A | 12/2000 | Araki et al. | |
| 6,259,283 B1 | 7/2001 | Nguyen | |
| 6,272,646 B1 * | 8/2001 | Rangasayee et al. | 713/500 |
| 6,282,627 B1 | 8/2001 | Wong et al. | |
| 6,353,649 B1 | 3/2002 | Bockleman et al. | |
| 6,480,045 B1 | 11/2002 | Albean | |
| 6,538,489 B1 * | 3/2003 | Nakano | 327/297 |
| 6,686,805 B1 * | 2/2004 | Cyrusian | 331/25 |
| 6,784,707 B1 * | 8/2004 | Kim et al. | 327/158 |
| 6,794,913 B1 | 9/2004 | Stengel | |
| 2003/0014682 A1 * | 1/2003 | Schmidt | 713/500 |
| 2003/0152181 A1 | 8/2003 | Stengel et al. | |

* cited by examiner

*Primary Examiner*—Lynne H. Browne
*Assistant Examiner*—Paul Yanchus, III

(57) ABSTRACT

A reconfigurable processor circuit (200) consistent with certain embodiments of the present invention has an array of configurable circuit blocks (208), wherein certain of the configurable circuit blocks (208) comprise one of configurable arithmetic logic units and clocked digital logic circuits. A control processor (218) configures a function of a plurality of the configurable circuit blocks. A memory (224) stores program instructions used by the control processor (218). A multiple frequency generator (230) receives a reference clock and synthesizes the plurality of clock signals therefrom, each clock signal being configured in frequency by the control processor (218). A timing control circuit (236) receives the plurality of clock signals, allocates the plurality of clock signals of different frequency among the plurality of circuit blocks and routes the clock signals to the circuit blocks, wherein the timing control circuit (236) operates under control of the control processor (218).

16 Claims, 3 Drawing Sheets

230

RECONFIGURABLE PROCESSING CIRCUIT INCLUDING A DELAY LOCKED LOOP MULTIPLE FREQUENCY GENERATOR FOR GENERATING A PLURALITY OF CLOCK SIGNALS WHICH ARE CONFIGURED IN FREQUENCY BY A CONTROL PROCESSOR

FIELD OF THE INVENTION

This invention relates generally to the field of reconfigurable processors. More particularly, in certain embodiments, this invention relates to a reconfigurable processor that can run at multiple configurable clock frequencies.

BACKGROUND OF THE INVENTION

The field of reconfigurable processors is currently undergoing a period of rapid advances. Reconfigurable processors are circuit arrangements containing an array of circuits such as processors, arithmetic logic units (ALU), memory, interfaces, and other logic, digital and/or analog circuits that can be configured to operate in a desired manner under programmed control. Thus, the same circuit can be configured and reconfigured to operate in several ways depending upon the manner in which the circuit configuration is programmed. One popular application for such circuitry is in the field of digital signal processing (DSP). In this field, for example, a reconfigurable processor might operate as a first type of modem in a first environment and a second type of modem in a different environment.

In conventional reconfigurable processors, a single fixed clock is used to control the timing of internal functions. That is, the signal processing data path fabric operates at one fixed internal clock frequency. This can lead to high power consumption for certain DSP applications. This is almost always undesirable, but is particularly bothersome in battery-powered devices whose battery life is dependent upon minimizing excess power consumption.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
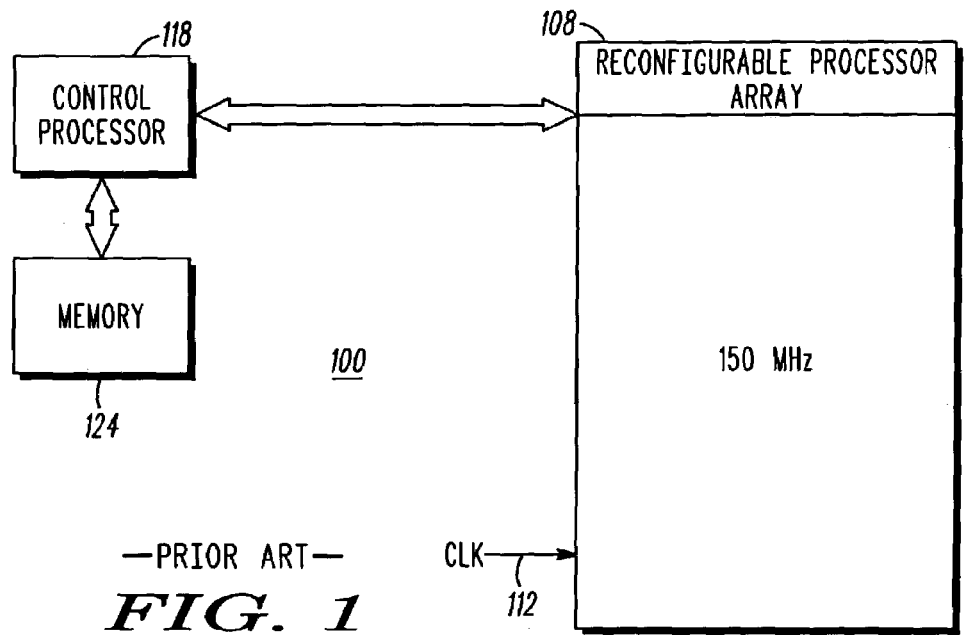
FIG. 1 is a conventional reconfigurable processor circuit.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/ dynamic load library and/or other sequence of instructions designed for execution on a computer system.

Reconfigurable processors are circuit arrangements containing an array of circuits such as processors, arithmetic logic units (ALU), memory, interfaces, and other logic, digital and/or analog circuits that can be configured to operate in a desired manner under programmed control. Turning now to FIG. 1, a conventional reconfigurable processor array circuit 100 is depicted. In this circuit 100 a reconfigurable processor array receives a single clock signal 112, (e.g., a 150 Mhz clock signal). This single clock signal drives all of the reconfigurable blocks of the reconfigurable processor array 108. In accordance with the conventional operation of such circuits, a control processor 118 (which is externally programmed) is used to control the specific configuration of the reconfigurable processor array 108 using instructions and data stored in a memory (e.g., a Random Access Memory) 124. As previously mentioned, with this arrangement, all of the reconfigurable processor array operates at a single clock frequency which may result in certain of the processing array operating at an unnecessarily high clock rate, thus consuming an unnecessarily large amount of power.

Figure 2:
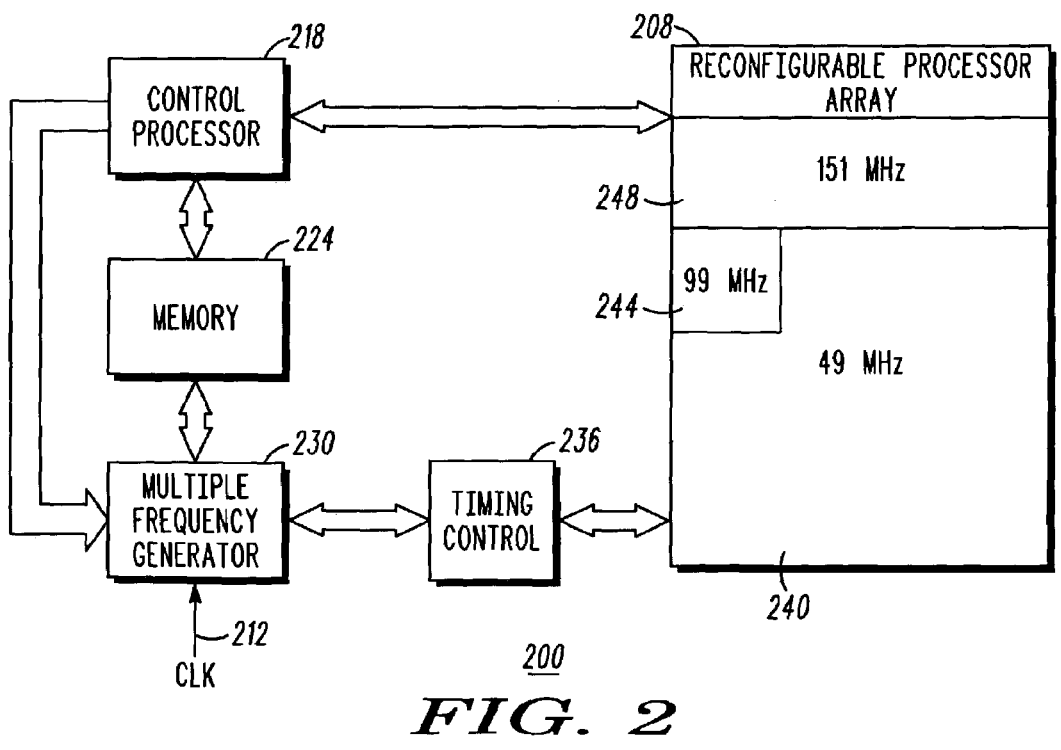
FIG. 2 is a reconfigurable processor circuit with multiple frequency generator capabilities consistent with certain embodiments of the present invention.

FIG. 2 depicts a reconfigurable processor circuit 200 consistent with certain embodiments of the present invention in which multiple clock frequencies can be programmed along with the programming of the reconfigurable processor array 208. This allows for the user to run the processing array 208 (also referred to as data path fabric, or fabric) under program control at multiple clock frequencies. Hence the user can define which portions of the processing array 208 can run at certain frequencies. This allows the user to run portions of the processor array 208 at lower clock frequencies, which leads to lower power consumption for applications such as certain digital signal processing (DSP) applications.

In this exemplary embodiment, a control processor 218 programs the reconfigurable processing array 208 to function in a desired manner under program control much like circuit 100. The programming for such control may be stored in memory 224. However, in the present embodiment, a clock signal 212 is supplied to a multiple frequency generator circuit 230, which derives multiple clock signals from clock signal 212, also under program control from control processor 230 (which is again externally programmed). Multiple frequency generator 230 receives instructions from control processor 218 that instructs multiple frequency generator 230 to generate a selected collection of clock frequencies, e.g., by deriving such clock frequencies from the clock 212. These clock signals are then provided to a timing control circuit 236 (which in certain embodiments may be embodied as a part of control processor 218). Timing control circuit 236 allocates and distributes the multiple clock frequencies to the various portions of the reconfigurable processing array 208 so that different portions of the reconfigurable processing array 208 can operate at different clock rates. For this exemplary embodiment, the reconfigurable processor array 208 is depicted as having been divided into three blocks (or collection of processing functions) that operate at three different clock rates. Block 240 operates at 50 Mhz, block 244 operates at 100 Mhz and block 248 operates at 150 Mhz. If this processor circuit 200 carries out a similar process as that of circuit 100, it is likely to require less power (assuming the multiple frequency generator and timing control functions use minimal additional power).

Figure 3:
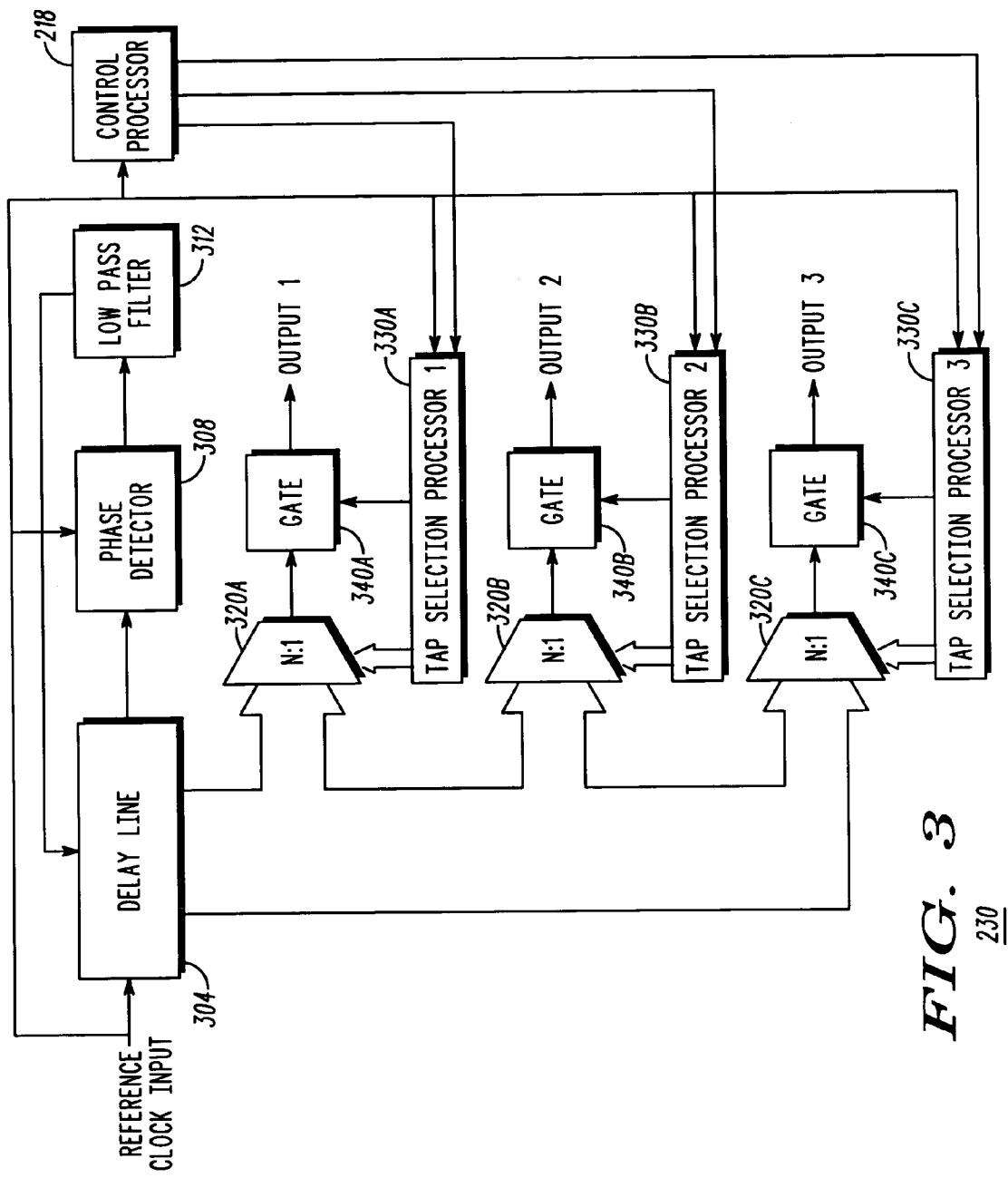
FIG. 3 illustrates an exemplary multiple frequency generator suitable for use in a reconfigurable processor circuit consistent with certain embodiments of the present invention.

In one embodiment, a multiple frequency generator based on a delay locked loop can be used to generate multiple clock signals in the multiple frequency generator 212. FIG. 3 illustrates one technique, consistent with an embodiment of the present invention, of synthesizing multiple frequencies (in this example three frequencies are synthesized simultaneously) while reducing the current drain when compared with that of three separate synthesizers. In this example, a tapped delay line 304 receives a reference clock input signal and produces a delayed version thereof at an output. The delay line has N buffers in series, and each buffer has two or more inverters. Each buffer delay the reference clock signal a fraction of its wavelength locked by the delay lock loop (DLL). The output of the delay line and the reference clock are inputs into a phase detector 308 and a low pass filter 312. The output and reference clock inputs are compared at a phase detector 308 and the output of the phase detector is low pass filtered at 312 to produce a signal that controls the overall delay of the delay line 304 .

The delay line 304's taps are provided as inputs to multiple multiplexers 320A, 320B and 320C. Under control of one or more tap selection processors such as 330A, 330B and 330C appropriately select combinations of the delay signals from the delay line taps to produce synthesized clock signals, based upon control commands issued from control processor 216. These synthesized clock signals may be gated by gating circuits 340A, 340B and 340C to produce output 1, output 2 and output 3 respectively representing three synthesized frequencies. Of course, more or fewer frequencies may be synthesized without departing from the invention.

In order to generate the multiple synthesized output signals, the same delay locked loop structure is shared with the delay line 304's tap outputs being provided to a multiple circuit arrangements for selection of the taps. Thus, any collection of three output frequencies can be generated using the arrangement of FIG. 3. Of course, the present multiple frequency generator is in no way limited to systems to produce three outputs. In general, two or more output selection circuits can be used to provide any desired number of output frequencies. Using CMOS or other high input impedance multiplexers, loading on the delay line is generally insignificant. However, driver circuitry can be used to boost the drive capacity of the delay line taps if necessary, with any delays introduced by the drivers appropriately accounted for. In light of this discussion, those skilled in the art will recognize that a single tap selection processor that by various means produces multiple tap addresses for the various multiplexers is entirely equivalent to the multiple tap selection processors shown. Thus, the illustration of multiple or single tap selection processors is simply a matter of convenience in illustration for any particular embodiment and should not be considered to be a limitation. By use of the above structure of circuit 230, for example, substantial current drain savings can be achieved over use of three separate DLL circuits. The above circuit arrangement 230 can thus be used to synthesize any desired set of frequencies (to within the accuracy of the DLL).

Thus, the reconfigurable processing array with variable timing control as described herein may be implemented as a software reconfigurable digital signal processor/processing array. The processing array is a matrix of ALU substructures (commonly called the data path in a conventional DSP) or a collection of digital blocks that are clocked by reference clocks. The circuit is frequency reconfigurable in the sense that the processing array 208 can run at multiple clock frequencies. Thus, certain embodiments consistent with this invention provide a more scalable and lower power consuming digital signal processor than those previously available. Certain embodiments consistent with the invention also permit the various clock speeds to be dynamically changed as deemed desirable to enhance performance while minimizing power consumption.

Referring back to FIG. 2, the reconfigurable processor array 208 (also referred to as the Baseband Processing Fabric or simply "Fabric") may be made up of an array of Arithmetic Logic Unit (ALU) substructures denoted as Processing Units (PU's). Each PU is software reconfigurable executing a list of assembly instruction per software that is downloaded during a configuration process. Each PU can run at independent clock frequencies $f_{pu}$, where $F_{min} <= f_{pu} <= F_{max}$. The fabric can run at multiple frequencies, in other words the control processor 218 and timing control circuit 236 allocates and routes clocks to the fabric 208 to produce frequency reconfigurablity throughout the fabric. In the example shown, one software image runs one segment of the fabric at 151 MHz, another segment of the fabric at 99 Mhz and yet another segment of the fabric at 49 MHz.

However, the fabric 208 and multiple frequency generator 212 can be reconfigured at will (even dynamically) by a new software download that configures a portion of the fabric 208 to run, for example, at 197.5 MHz, while another segment of the fabric runs at 99 MHz, and a final portion of the fabric 208 runs at 50 MHz. For example, a new software download could subdivide the fabric 208 into five new portions and run each portion at 252 MHz, 199 MHz, 150 MHz, 100 MHz, and 85 MHz respectively. Furthermore, each of the five new portions could be programmed to run at any frequency within a specified frequency range (dependant on the application). For example, portion one could operate within 249–260 MHz; portion two could operate within 188–201 MHz; portion three could operate within 136–151 MHz; portion four could operate within 88–105 MHz; and portion five could operate within 83–90 MHz. Each of the five new portions would have a new processing task dependant on functional parameters. This gives the user a powerful ability to reconfigure the frequency of operation of the reconfigurable processor array 208. Each ALU substructure (PU) in the fabric 208 can be reconfigured in both processing task and frequency. While the fabric 208 is described above as an array of ALU substructures acting as Processing Units, the fabric 208 could equivalently include a collection of any analog or digital blocks that utilize reference clocks.

The Integrated Control Processor 218 is for the control of the fabric 208, multiple frequency generator 230, timing control circuit 236 and off-chip communications. The control processor 218 controls new software downloads on the fabric.

The multiple frequency generator circuit 230 produces multiple, independent (or dependent) clock frequencies f1, . . . ,fn to be used as clocking signals within the fabric 208. Any suitable multiple frequency generator 230 such as that shown in FIG. 3 can be implemented as a low power solution for the multiple frequency generator.

The timing control circuit 236 allocates which PU's in the fabric will run at different frequencies f1, . . . ,fn and routes the clocks through the fabric.

In addition to the ability to potentially reduce power consumption, certain embodiments consistent with the present invention also provide more DSP algorithm flexibility. Certain architectures consistent with the present invention allow the user to run fast and slow processing algorithms in a parallel fashion without having to allocate more silicon to faster algorithms. While the fabric 208 is described above as an array of ALU substructures acting as Processing Units, the fabric could equally well have a collection of any digital or analog circuit blocks using reference clocks. By way of example and not limitation, the processing fabric might have a collection of data converters whose reference clocks could be decreased (or shut off) when not processing data (i.e., clock gear shifting).

The multiple frequency generator 230 can be implemented as a low power solution to further reduce power consumption for this circuit. The output frequencies of the multiple frequency generator are digitally programmable and therefore conducive to a software reconfigurable application. Also, the multiple frequency generator 230 consistent with certain embodiments of the invention is able to change frequencies on a cycle-to-cycle basis because it does not incur lock time limitations found in traditional phase-locked loop (PLL) frequency synthesizers (however, this does not suggest that an embodiment consistent with the present invention cannot be based upon a PLL frequency synthesizer). Use of the multiple frequency generator 230 as depicted in FIG. 3 produces multiple independent outputs from a single reference clock without need for multiple phase locked loops.

Thus, a reconfigurable processor circuit consistent with certain embodiments of the present invention has an array of configurable circuit blocks. A control processor configures a function of a plurality of the configurable circuit blocks. A multiple frequency generator generates a plurality of clock signals, each clock signal being configured in frequency by the control processor. A timing control circuit receives the plurality of clock signals, allocates the plurality of clock signals of different frequency among the plurality of circuit blocks and routes the clock signals to the circuit blocks.

A reconfigurable processor circuit consistent with certain other embodiments of the present invention has an array of configurable circuit blocks, wherein certain of the configurable circuit blocks comprise one of configurable arithmetic logic units and clocked digital logic circuits. A control processor configures a function of a plurality of the configurable circuit blocks. A memory stores program instructions used by the control processor. A multiple frequency generator receives a reference clock and synthesizes the plurality of clock signals, each clock signal being configured in frequency by the control processor. A timing control circuit receives the plurality of clock signals, allocates the plurality of clock signals of different frequency among the plurality of circuit blocks and routes the clock signals to the circuit blocks, wherein the timing control circuit operates under control of the control processor.

Figure 4:
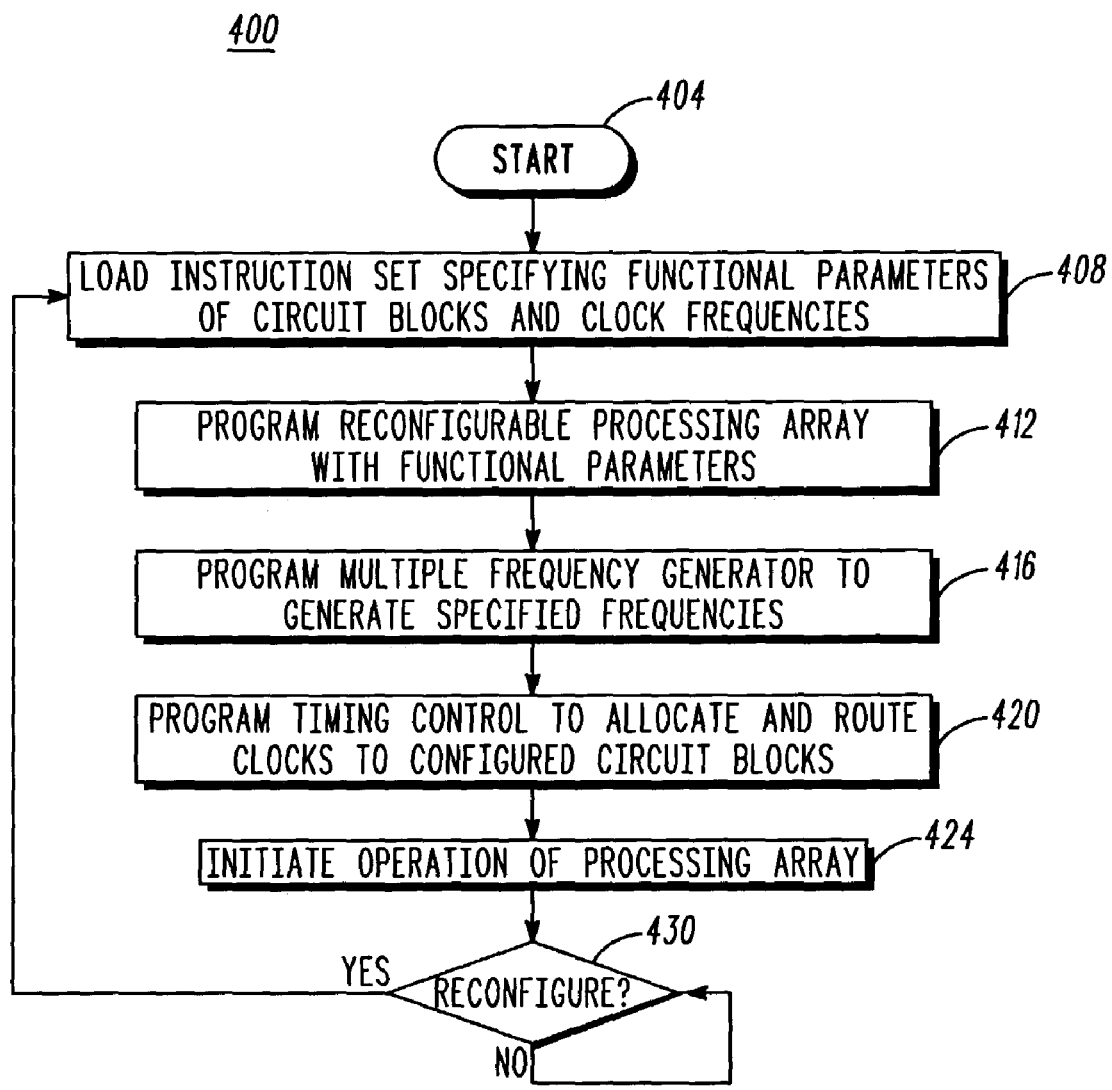
FIG. 4 depicts a process of configuring the reconfigurable processor circuit in a manner consistent with certain embodiments of the present invention.

One process for configuration of a reconfigurable processor circuit consistent with certain embodiments of the invention is depicted in flow chart form as process 400 of FIG. 4, starting at 404. At 408, an instruction set is loaded from an external source to the control processor 218. Such instructions specify the functional parameters of the configurable circuits forming a part of the fabric 208 as well as clock frequencies for each of the configurable circuit or group of circuits. The configurable processing array 208 is then programmed with the appropriate functional parameters to configure the array 208 as desired at 412. At 416, the multiple frequency generator is programmed to generate the specified clock frequencies from the reference clock signal 212. The timing control circuit 236 is then programmed to allocate and route clock signals to the various configurable circuits of fabric 208 at 420. At this point, the reconfigurable processor circuit 200 is fully programmed and configured and operation of the circuit 200 can be initiated at 424. This configuration remains functional until such time as a reconfiguration is initiated at 430, at which point, control returns to 408 to reconfigure the circuit 200.

While process 400 is depicted as a sequential process, the actual order of the programming functions 412, 416 and 420 can be rearranged as desired or carried out somewhat in parallel without departing from the invention. Such variations are considered fully equivalent and are contemplated by the present invention.

Thus, a method of configuring a reconfigurable processor circuit consistent with certain embodiments of the present invention involves receiving a set of configuration instructions the control instructions specifying functional parameters and clock frequency of a circuit block; configuring the circuit block with the functional parameters; and routing a clock signal having the clock frequency to the circuit block.

The present invention, as described in certain exemplary embodiments herein, may be implemented using the programmed control processor executing programming instructions that are broadly described above, in flow chart form, that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations made without departing from the present invention. Such variations are contemplated and considered equivalent.

Circuit arrangements consistent with the present invention can be used for many digital signal processing functions such as cellular base stations for multiple or programmable air interfaces, cellular handsets for multiple or programmable air interfaces as well as air interfaces for other such wireless communication devices. Many other applications will occur to those skilled in the art upon consideration of this teaching.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A reconfigurable processor circuit, comprising:
an array of configurable circuit blocks;
a control processor that configures a function of a plurality of the configurable circuit blocks;
a delay locked loop multiple frequency generator that receives a reference clock as an input and generates a plurality of clock signals as outputs, each clock signal being configured in frequency by the control processor, the delay locked loop multiple frequency generator comprising:
a delay line with a plurality of tap outputs from each of a plurality of delay elements;
a phase detector that compares the reference clock with an output of the delay line and produces an output related to a result of the comparison;
a low pass filter receiving the phase detector output as an input and producing a filtered output that controls a delay of the delay line;
a plurality multiplexers each receiving the plurality of outputs from the delay line and producing one of the plurality of clock signals as an output; and
a tap selection processor, responsive to the control processor, that configures each multiplexer to select a set of tap outputs that produces a specified clock signal at the output of each of the associated multiplexers;
whereby, the clock signal at the output of any of the multiplexers can be changed by reconfiguration of the associated multiplexer by the tap selection processor without incurring a period of instability;
a timing control circuit that receives the plurality of clock signals, allocates the plurality of clock signals of different frequency among the plurality of circuit blocks and routes the clock signals to the circuit blocks, wherein the allocating and routing are carried out under program control.

2. The reconfigurable processor circuit according to claim 1, wherein the timing control circuit operates under control of the control processor.

3. The reconfigurable processor circuit according to claim 1, wherein the timing control forms a part of the control processor.

4. The reconfigurable processor circuit according to claim 1, wherein certain of the configurable circuit blocks comprise configurable arithmetic logic units.

5. The reconfigurable processor circuit according to claim 1, wherein certain of the configurable circuit blocks comprise clocked digital logic circuits.

6. The reconfigurable processor circuit according to claim 1, further comprising a memory that stores program instructions used by the control processor.

7. The reconfigurable processor circuit according to claim 1, realized in an integrated circuit.

8. The reconfigurable processor circuit according to claim 1, wherein array of configurable circuits is configured to carry out a digital signal processing function.

9. The reconfigurable processor circuit according to claim 8, wherein the digital signal processing function comprises an air interface for a wireless communications device.

10. A reconfigurable processor circuit, comprising:
an array of configurable circuit blocks, wherein certain of the configurable circuit blocks comprise one of configurable arithmetic logic units and clocked digital logic circuits;
a control processor that configures a function of a plurality of the configurable circuit blocks;
a memory that stores program instructions used by the control processor;
a delay locked loop multiple frequency generator that receives a reference clock as an input and synthesizes a plurality of clock signals as outputs therefrom, each clock signal being configured in frequency by the control processor, the delay locked loop multiple frequency generator comprising:
a delay line with a plurality of tap outputs from each of a plurality of delay elements;
a phase detector that compares the reference clock with an output of the delay line and produces an output related to a result of the comparison;
a low pass filter receiving the phase detector output as an input and producing a filtered output that controls a delay of the delay line;
a plurality multiplexers each receiving the plurality of outputs from the delay line and producing one of the plurality of clock signals as an output; and
a tap selection processor, responsive to the control processor, that configures each multiplexer to select a set of tap outputs that produces a specified clock signal at the output of each of the associated multiplexers;
whereby, the clock signal at the output of any of the multiplexers can be changed by reconfiguration of the associated multiplexer by the tap selection processor without incurring a period of instability; and
a timing control circuit that receives the plurality of clock signals, allocates the plurality of clock signals of different frequency among the plurality of circuit blocks and routes the clock signals to the circuit blocks, wherein the timing control circuit operates under control of the control processor to allocate and route the clock signals to the circuit blocks.

11. The reconfigurable processor circuit according to claim 10, realized in an integrated circuit.

12. The reconfigurable processor circuit according to claim 10, wherein array of configurable circuits is configured to carry out a digital signal processing function.

13. The reconfigurable processor circuit according to claim 12, wherein the digital signal processing function comprises an air interface for a wireless communications device.

14. A method of configuring a reconfigurable processor circuit, comprising:
receiving a set of configuration instructions the configuration instructions specifying functional parameters and clock frequency of a circuit block;
providing a delay locked loop multiple frequency generator that receives a reference clock as an input and synthesizes a plurality of clock signals as outputs therefrom, each clock signal being configured in frequency by the control processor, wherein the delay locked loop multiple frequency generator comprises:
a delay line with a plurality of tap outputs from each of a plurality of delay elements;
a phase detector that compares the reference clock with an output of the delay line and produces an output related to a result of the comparison;

a low pass filter receiving the phase detector output as an input and producing a filtered output that controls a delay of the delay line;

a plurality multiplexers each receiving the plurality of outputs from the delay line and producing one of the plurality of clock signals as an output; and a tap selection processor, responsive to the control processor, that configures each multiplexer to select a set of tap outputs that produces a specified clock signal at the output of each of the associated multiplexers;

whereby, the clock signal at the output of any of the multiplexers can be changed by reconfiguration of the associated multiplexer by the tap selection processor without incurring a period of instability;

at the delay locked loop multiple frequency generator, generating a plurality of clock signals including the clock signal having the clock frequency to the circuit block based upon the configuration instructions;

providing the plurality of clock signals to a timing control circuit;

configuring the circuit block with the functional parameters;

at the timing control circuit, allocating and routing the clock signal having the clock frequency to the circuit block based upon the configuration instructions; and changing the clock frequency without incurring a period of instability.

15. The method according to claim 14, wherein certain of the circuit block comprises one of a configurable arithmetic logic unit and a clocked digital logic circuit.

16. The method according to claim 14, wherein the circuit block is configured to carry out at least a portion of a digital signal processing function.

\* \* \* \* \*